(12) United States Patent
Kurachi (10) Patent No.: US 7,854,088 B2
(45) Date of Patent: Dec. 21, 2010

(54) ANIMAL TRAP

(76) Inventor: Steve T. Kurachi, 1812 Justin La., Austin, TX (US) 78757-2409

( * ) Notice: Subject to any disclaimer, the term of this patent is extended or adjusted under 35 U.S.C. 154(b) by 141 days.

(21) Appl. No.: 12/232,235

(22) Filed: Sep. 12, 2008

(65) Prior Publication Data
US 2010/0064572 A1   Mar. 18, 2010

(51) Int. Cl.
*A01M 23/00* (2006.01)
*A01M 23/08* (2006.01)
*A01M 23/20* (2006.01)
*A01M 23/38* (2006.01)

(52) U.S. Cl. .................. 43/61; 43/58; 43/60; 43/67; 43/98

(58) Field of Classification Search .......... 43/58, 43/60, 61, 64–67, 98; 119/422, 416, 502, 119/510, 752, 843, 481, 494, 501, 506, 524, 119/751; 256/10
See application file for complete search history.

(56) References Cited

U.S. PATENT DOCUMENTS

| | | | | | |
|---|---|---|---|---|---|
| 343,939 | A | * | 6/1886 | Wilson | 256/10 |
| 383,700 | A | * | 5/1888 | Brusie | 43/66 |
| 431,777 | A | * | 7/1890 | Miller et al. | 43/98 |
| 630,131 | A | * | 8/1899 | Tarr | 43/61 |
| 877,138 | A | * | 1/1908 | Stone | 43/67 |
| 986,010 | A | * | 3/1911 | Kennedy | 43/61 |
| 1,182,018 | A | * | 5/1916 | Koenig | 43/61 |
| 1,255,798 | A | * | 2/1918 | Schuckman | 43/61 |
| 1,349,453 | A | * | 8/1920 | Hall | 43/67 |
| 1,438,816 | A | * | 12/1922 | Fairbanks et al. | 43/65 |
| 1,441,998 | A | * | 1/1923 | Parker | 43/61 |
| 1,445,153 | A | * | 2/1923 | Mezei | 43/61 |
| 1,597,551 | A | * | 8/1926 | Stewart | 43/69 |
| 1,850,634 | A | * | 3/1932 | Pairo | 43/61 |

(Continued)

FOREIGN PATENT DOCUMENTS

GB   2393245   3/2004

OTHER PUBLICATIONS

Internet document, http://www.ces.ncsu.edu/nreos/wild/pdf/wildlife/WILD_PIGS.PDF, six pages dated 1994, information on characteristics, habits, trapping, and eradicating wild pigs, hogs, and boars.

*Primary Examiner*—Darren W Ark
(74) *Attorney, Agent, or Firm*—Richard C. Litman (57) ABSTRACT

The animal trap includes an enclosure for containing a number of relatively large animals. An entry path (game trail, etc.) extends from the enclosure to an automated drop gate at the entrance, or may comprise the enclosure with a gate at each end. At least one double articulated trip arm is placed along the entry path. The trip arm does not actuate the gate when moved toward the enclosure, i.e., when animals pass through the entry path from the drop gate entrance to the enclosure. However, animals passing in the opposite direction move the trip arm(s) toward the gate, causing at least one trip arm to close a circuit and drop the gate to close the trap. The trap is thus configured to capture a number of herd animals, e.g., wild pigs, passing from the gate toward the enclosure, before one of the animals turns back and trips the gate.

19 Claims, 10 Drawing Sheets

U.S. PATENT DOCUMENTS

| | | | | |
|---|---|---|---|---|
| 1,857,658 A * | 5/1932 | Pfretzschner | | 43/98 |
| 1,937,260 A * | 11/1933 | Young | | 43/61 |
| RE19,922 E * | 4/1936 | Gengler | | 256/10 |
| 2,146,229 A * | 2/1939 | Riepl | | 256/10 |
| 2,315,345 A * | 3/1943 | Mieth | | 43/66 |
| 2,376,630 A * | 5/1945 | Stentz | | 256/10 |
| 2,488,202 A * | 11/1949 | Kern | | 43/61 |
| 2,524,423 A * | 10/1950 | Buford | | 43/60 |
| 2,527,511 A * | 10/1950 | Alois | | 43/61 |
| 2,530,247 A * | 11/1950 | Koonz | | 256/10 |
| 2,897,627 A * | 8/1959 | Neid | | 43/65 |
| 3,122,856 A * | 3/1964 | Jones | | 43/66 |
| 3,197,916 A * | 8/1965 | Cole, Jr. et al. | | 43/66 |
| 3,747,897 A * | 7/1973 | Conley | | 43/98 |
| 3,805,741 A * | 4/1974 | Thompson et al. | | 119/510 |
| 3,931,796 A * | 1/1976 | Hoffman | | 119/510 |
| 3,970,045 A * | 7/1976 | Graham, Jr. | | 119/843 |
| 4,138,796 A | 2/1979 | Souza | | |
| 4,187,634 A * | 2/1980 | Kintz | | 43/61 |
| 4,322,913 A | 4/1982 | Himmer | | |
| 4,445,460 A * | 5/1984 | Stencil | | 119/510 |
| 4,497,133 A | 2/1985 | Blenkinsop | | |
| 4,546,568 A | 10/1985 | Seyler | | |
| 4,554,758 A | 11/1985 | Molloy | | |
| 4,567,688 A * | 2/1986 | McKee | | 43/61 |
| 4,707,943 A * | 11/1987 | Benigno | | 43/61 |
| 4,779,373 A * | 10/1988 | Krenson | | 43/66 |
| 4,862,637 A * | 9/1989 | Dressel | | 43/98 |
| 4,912,872 A * | 4/1990 | Wynn et al. | | 43/61 |
| 4,953,500 A * | 9/1990 | Savage-Rumbaugh et al. | | 119/481 |
| 4,965,959 A * | 10/1990 | Gagne | | 43/61 |
| 5,199,210 A * | 4/1993 | Nastas | | 43/61 |
| 5,235,778 A * | 8/1993 | Sutherlin | | 43/61 |
| 5,615,514 A * | 4/1997 | Meade, Jr. | | 43/61 |
| 5,778,594 A * | 7/1998 | Askins et al. | | 43/61 |
| 5,852,989 A * | 12/1998 | Fuchs | | 119/843 |
| 5,950,562 A * | 9/1999 | Schulte et al. | | 119/843 |
| 6,003,265 A * | 12/1999 | Lundgren | | 43/61 |
| 6,009,661 A * | 1/2000 | Lloyd | | 43/61 |
| 6,016,624 A | 1/2000 | Rose | | |
| 6,021,742 A * | 2/2000 | Cummings | | 119/843 |
| 6,202,340 B1 * | 3/2001 | Nieves | | 43/61 |
| 6,318,296 B1 * | 11/2001 | Nguyen | | 119/501 |
| 6,397,514 B1 * | 6/2002 | Toney | | 43/65 |
| 6,450,483 B1 * | 9/2002 | Baum | | 256/10 |
| 6,484,436 B1 * | 11/2002 | Chang | | 43/61 |
| 6,609,327 B2 * | 8/2003 | Stoico et al. | | 43/61 |
| 6,618,982 B2 * | 9/2003 | Lafforthun | | 43/61 |
| 6,658,788 B1 * | 12/2003 | Steinfest | | 43/61 |
| 6,691,463 B1 | 2/2004 | Richmond | | |
| 6,691,483 B2 | 2/2004 | Lethers | | |
| 6,712,339 B1 * | 3/2004 | Smith | | 256/10 |
| 6,772,555 B2 * | 8/2004 | Evans et al. | | 43/61 |
| 6,814,026 B2 * | 11/2004 | Guo | | 119/524 |
| 7,174,853 B1 * | 2/2007 | Donaldson | | 119/843 |
| 7,213,539 B1 * | 5/2007 | Mollhagen | | 119/843 |
| 7,421,977 B2 * | 9/2008 | Van Den Berg | | 119/524 |
| 7,540,109 B2 * | 6/2009 | Hall | | 43/61 |
| 2002/0108584 A1 * | 8/2002 | van der Lely et al. | | 119/502 |
| 2002/0121044 A1 * | 9/2002 | Toney | | 43/58 |
| 2003/0066492 A1 * | 4/2003 | Fransen et al. | | 119/524 |
| 2004/0139924 A1 * | 7/2004 | Hannon | | 119/502 |
| 2005/0097808 A1 * | 5/2005 | Vorhies et al. | | 43/61 |
| 2005/0198901 A1 | 9/2005 | Solowiej | | |
| 2005/0217600 A1 * | 10/2005 | Berg | | 119/510 |
| 2006/0112904 A1 * | 6/2006 | Davis Mollhagen | | 119/843 |
| 2009/0032790 A1 * | 2/2009 | Timms | | 256/10 |
| 2009/0133317 A1 * | 5/2009 | Walther et al. | | 43/61 |
| 2009/0173285 A1 * | 7/2009 | Rasmussen et al. | | 119/502 |
| 2009/0266309 A1 * | 10/2009 | Hunter et al. | | 119/752 |
| 2009/0293340 A1 * | 12/2009 | Kelley | | 43/61 |

\* cited by examiner

ANIMAL TRAP

BACKGROUND OF THE INVENTION

1. Field of the Invention

The present invention relates generally to hunting and trapping. More specifically, the present invention comprises an animal trap having a drop gate at the entrance and an elongate pathway extending therefrom, with a series of double articulating trip arms disposed within the pathway.

2. Description of the Related Art

Animal traps and trapping have been known since the earliest of times. Such traps range in size and complexity from very small traps intended to capture and/or kill a mouse or other animal of similar size, up to large enclosures intended to capture large herd animals. These traps may be further subdivided into traps requiring human attention and observation, and automatically operating traps requiring no human action during their operation.

In the case of larger traps for herd animals, such traps generally require the presence and actions of human operators to close off a relatively narrow opening into a larger fenced or natural containment area for the animals. Where automated traps are provided for larger animals, the trigger mechanism is generally actuated only a single time, with the mechanism requiring resetting by a human operator after each actuation. Thus, such traps are generally capable of capturing only one animal, or, at most, two closely grouped animals at a time.

Thus, an animal trap solving the aforementioned problems is desired.

SUMMARY OF THE INVENTION

The animal trap has a relatively large enclosure capable of containing a large number of animals at one time. A relatively narrow and elongate path (game trail, etc.) extends from a drop gate at the entrance to the trap, to the larger enclosure. At least one, and most preferably a plurality of, double articulating trip arms are placed across the entrance path. These trip arms are free to swing in one direction, i.e., toward the enclosure and away from the drop gate, without tripping the gate. However, movement of the trip arm(s) in the opposite direction, i.e., toward the gate, closes a switch and causes the drop gate to fall, capturing the animals within the entry path and enclosure. The present trap will generally capture a number of animals, as several animals will wander through the entry path to the enclosure before one of the animals reverses its path and causes the gate to fall.

The trap is completely automatic and requires no human action or intervention other than checking the trap periodically to gather any captured animals and reset the gate, and/or to recharge the electrical battery used to power the gate release mechanism. Additional features may be provided, e.g., sheets of material may be placed immediately inside the periphery of the enclosure and path to prevent animals from digging their way out beneath the fence. This is particularly valuable in a trap used for capturing wild pigs, hogs, and boar. The electrical source used to power the gate release mechanism may also be used to charge an electric fence surrounding the trap.

An alternative trap layout comprises installing restraining fencing along a section of game trail or the like, and setting a gate and corresponding set of trip arms at each of the opposite ends of the fenced section of trail. Panels preventing the animals from digging out beneath the fenced area of the trail may be placed on the surface just inside the fencing. The fenced portion of the trail between the two gates becomes the entrapment enclosure for the animals.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
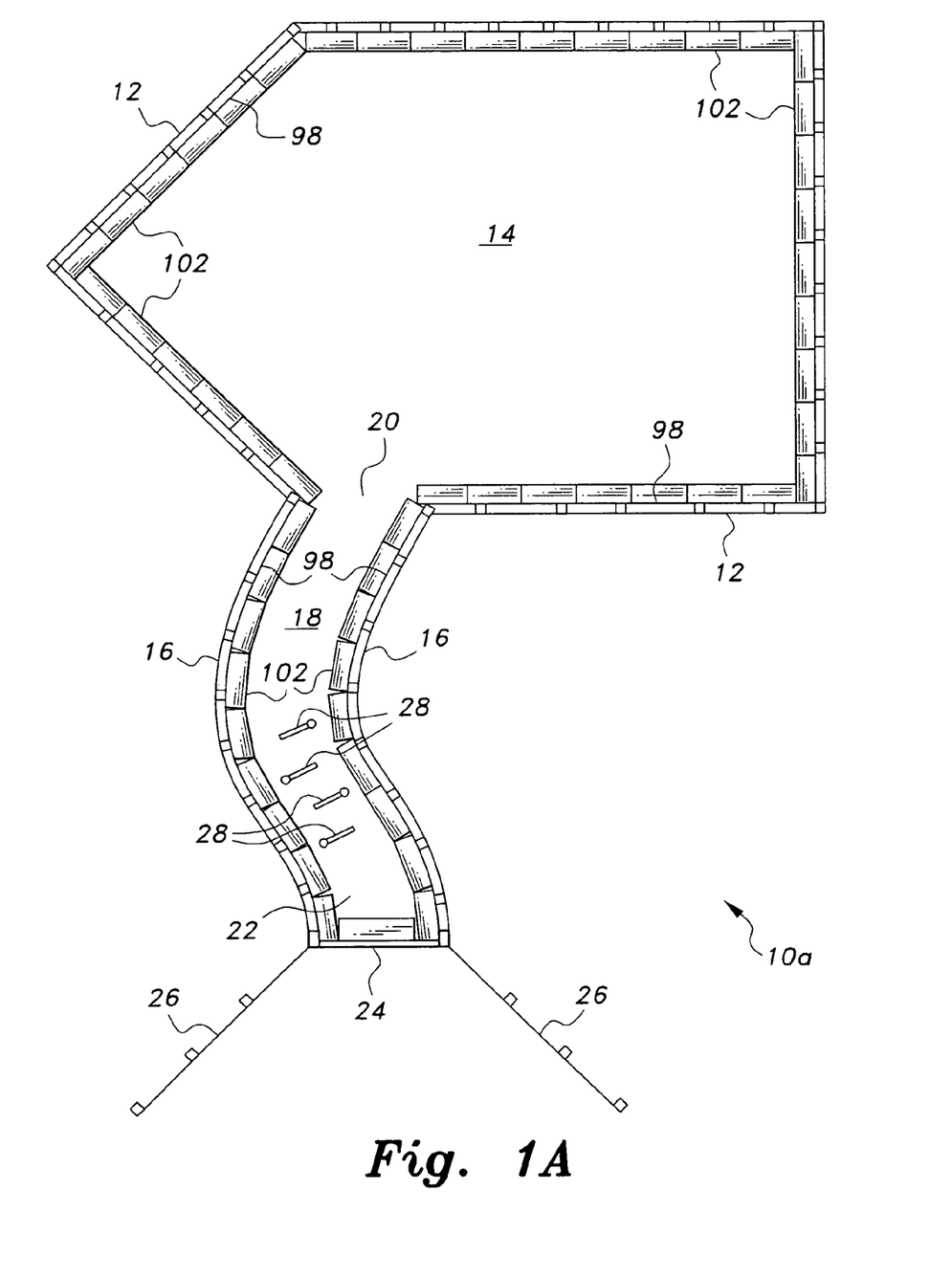
FIG. 1A is a schematic top plan view of an animal trap according to the present invention, showing its general layout and features.
Figure 1B:
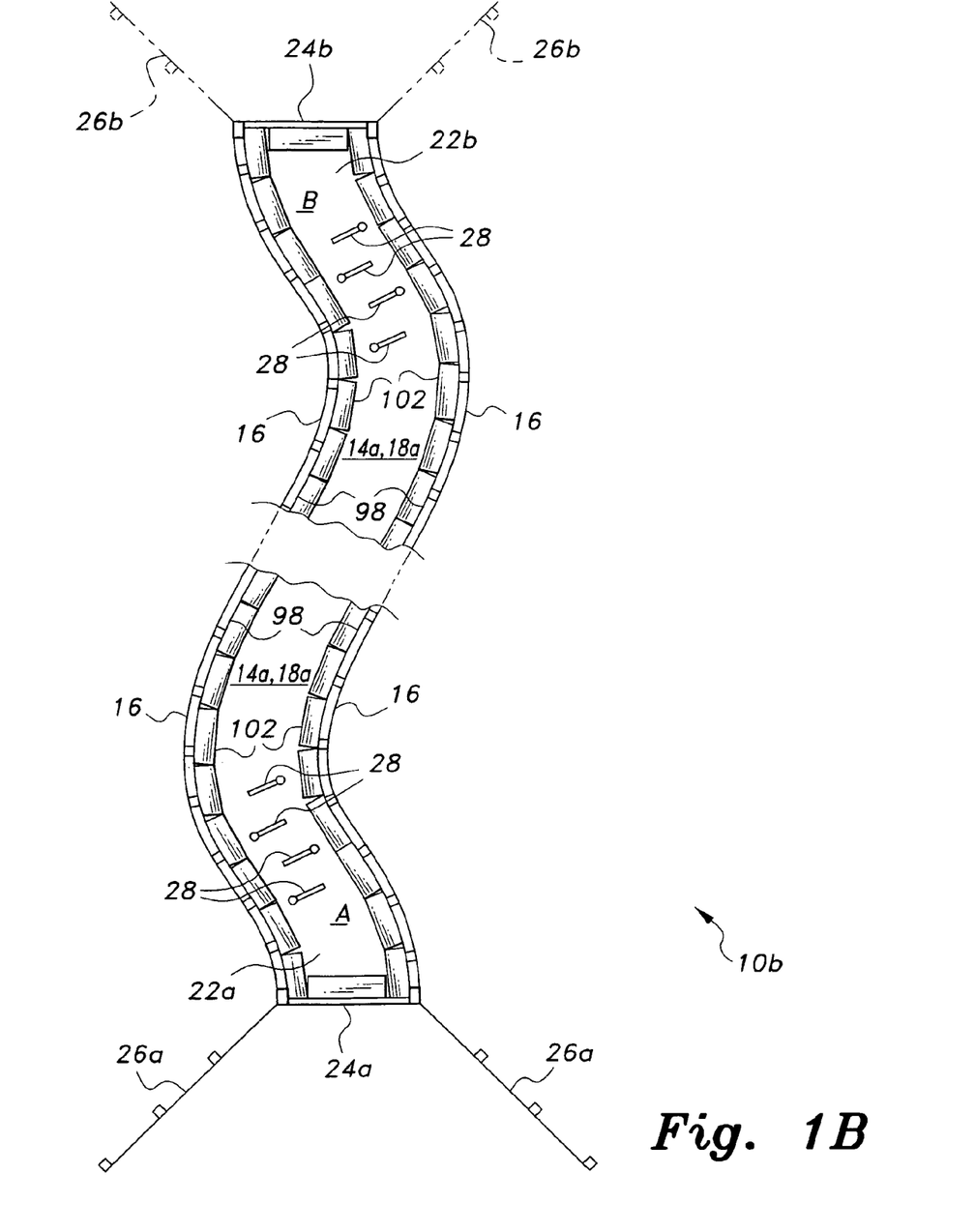
FIG. 1B is a schematic top plan view of an animal trap according to the present invention, showing an alternative layout along a game trail and incorporating two opposite gates and trip arm sets.

The animal trap may encompass a relatively large area (e.g., a large fraction of an acre, more or less) and has an enclosure area and an entry path leading into the enclosure area, generally as shown in FIG. 1A. The entry path may be established along an existing game trail, or otherwise laid out as desired. The entry path has an enclosure end opening into the enclosure, and an opposite entry end selectively closed by an automated drop gate actuated by the passage of animals in the exit direction through the entry path. This configuration allows a large number of animals to enter the trap through the entry path without tripping the gate and closing off entry to the trap, but closes the gate when one of the animals reverses its path and attempts to leave the trap. Alternatively, the trap enclosure may comprise a length of game trail or the like, with fencing set up along the sides of the trail and gates and their corresponding trip arms set up at each end of the fenced section, as shown in FIG. 1B.

FIG. 1A provides a schematic top plan view of an exemplary animal trap 10a according to the present invention. The trap 10a includes an enclosure fence 12 defining the periphery of the enclosure 14, and an entry path fence 16 defining the periphery of the relatively long and narrow entry path 18. The enclosure 14 may be of any practicable shape and size, with the pentagonal configuration shown in FIG. 1A being exemplary. As can be seen, the enclosure 14 need not be square or rectangular, although such shapes may be formed as desired. The enclosure 14 is preferably generally circular or oval with rounded interior corners, to prevent the animals from gathering in a corner. The entry path 18 has an enclosure end 20 connecting to the enclosure 14, and an opposite entry end 22 with an automatically actuated gate 24. Left and right wings 26 are preferably installed to each side of the entry end gate 24, to urge animals through the open gate 24 and into the entry path 18 and enclosure 14.

Many species of animals are known to travel a consistent route between their feeding ground and their sleeping area, or other areas frequented by the animals, e.g., water source, etc. Such game trails are prime sites for encountering and capturing such animals. Accordingly, FIG. 1B illustrates a configuration of the present trap in which the trap 10b is set up along a length or portion of a game trail. The length of trail having the trap thereon is designated with a first entry path end A and a second entry path end B in FIG. 1B, with corresponding gates 24a and 24b at each end. The two ends A and B may be considered as enclosure ends in the configuration of FIG. 1B, as the enclosure is contained between the two ends. Fencing 16 is installed along the sides of the trail, preferably set back somewhat from the actual trail itself in order to minimize detection by and/or disturbance of the animals frequenting the trail. The fencing 16 and the two gates 24a and 24b define an enclosure 14a therein, with the enclosure 14a and the entry path 18a being contiguous in the trap configuration 10b of FIG. 1B. Left and right wings 26a are shown to each side of the gate 24a at the first end A of the trail, with corresponding left and right wings 26b placed to each side of the gate 24b at the opposite end B of the trail. The wings 26b are shown in broken lines, as they are optional and not required. The first set of wings 26a and the wings 26 of the trap 10a of FIG. 1A may be deleted as well, if so desired.

At least one, and preferably a series of, double articulating trip arms 28 are installed along the entry path 18, as shown schematically in FIG. 1A. Trip arms 28 are also installed along the game trail 18a, as shown in FIG. 1B, with one set of trip arms installed along the trail near the first end A and first gate 24a, and another set of trip arms installed near the opposite second end B and second gate 24b. The trip arms 28 are essentially identical in both FIGS. 1A and 1B, with only their orientation changing according to their positioning relative to the adjacent gate in each trap configuration.

Figure 2:
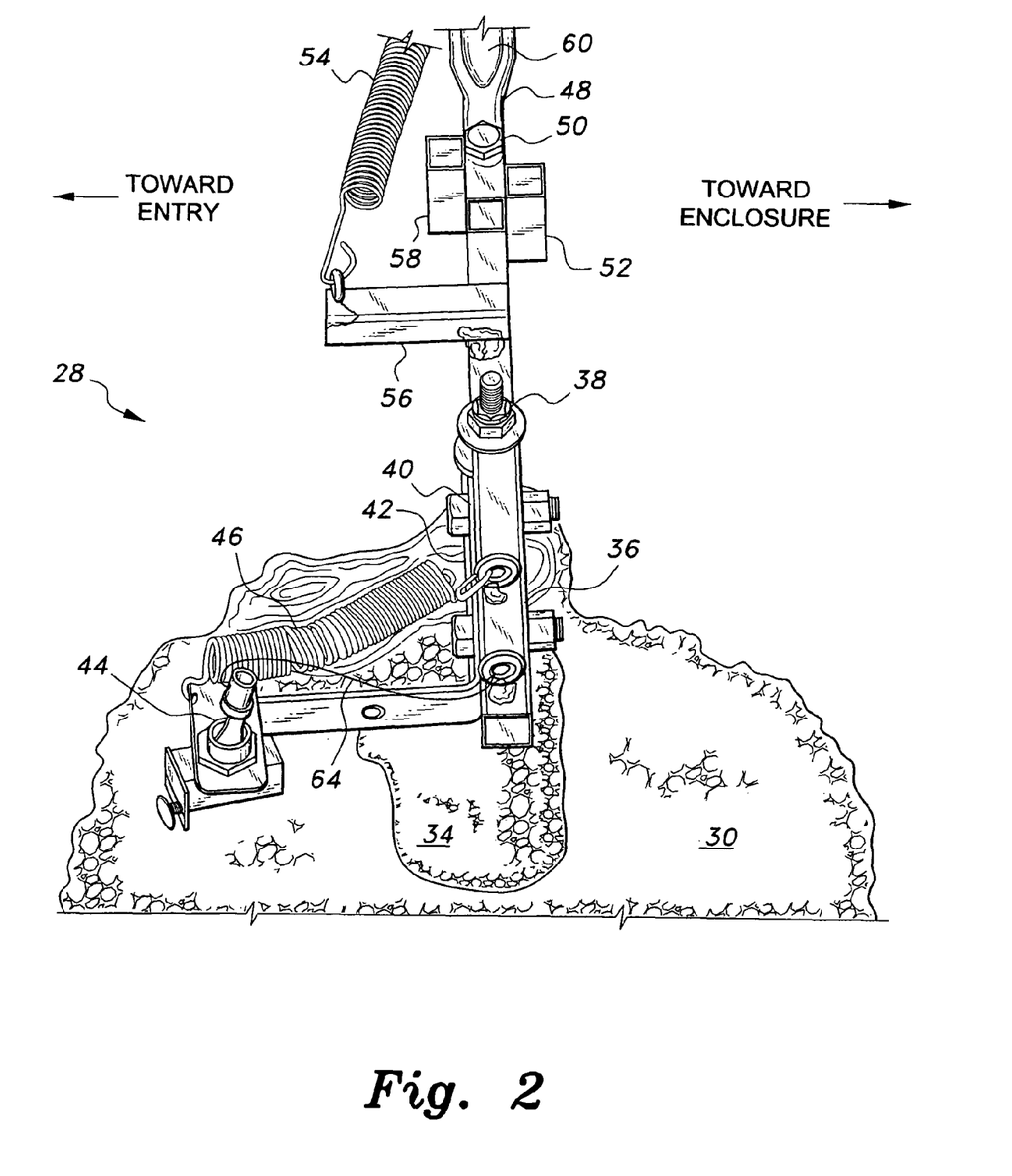
FIG. 2 is a detailed perspective view of the double articulating trip arm assembly used with the animal trap.
Figure 3:
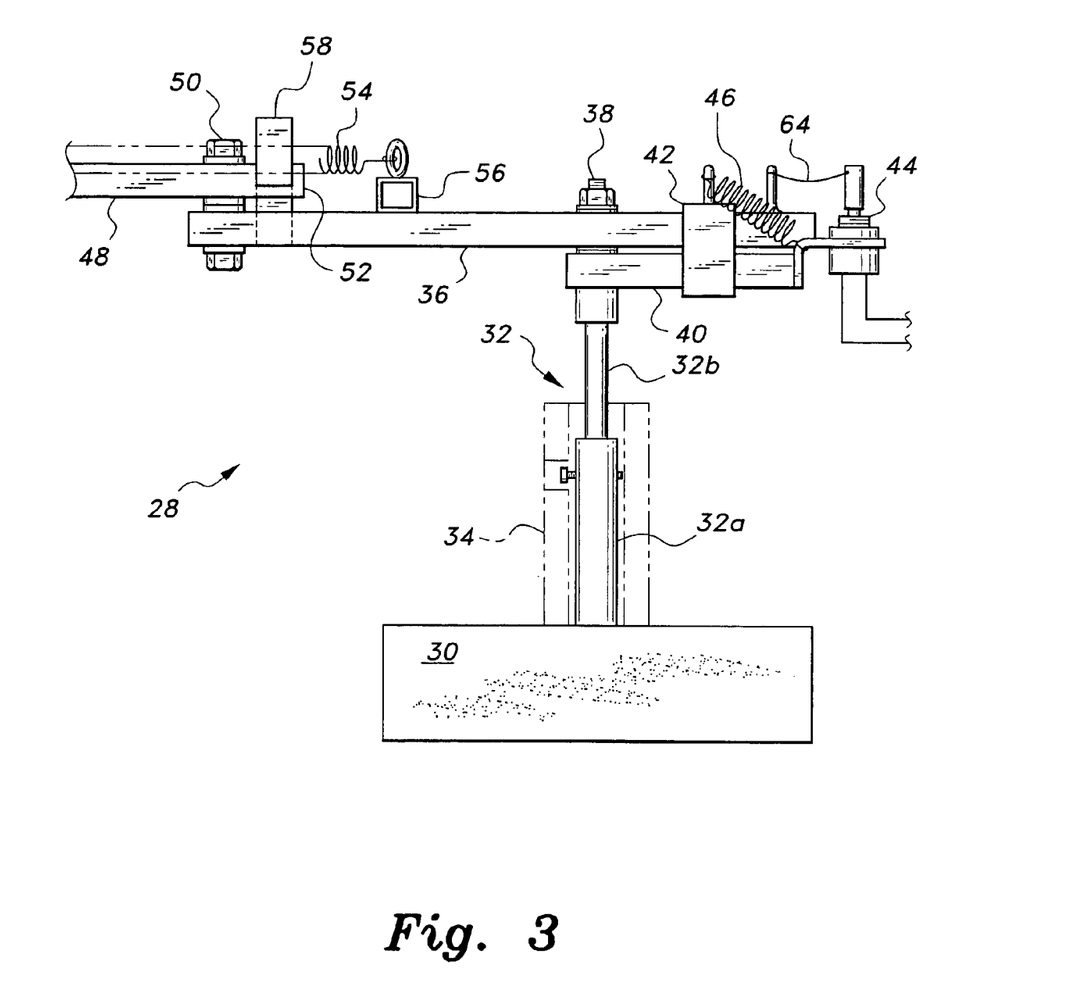
FIG. 3 is a detailed side elevation view of the trip arm of FIG. 2, showing further details thereof.
Figure 4:
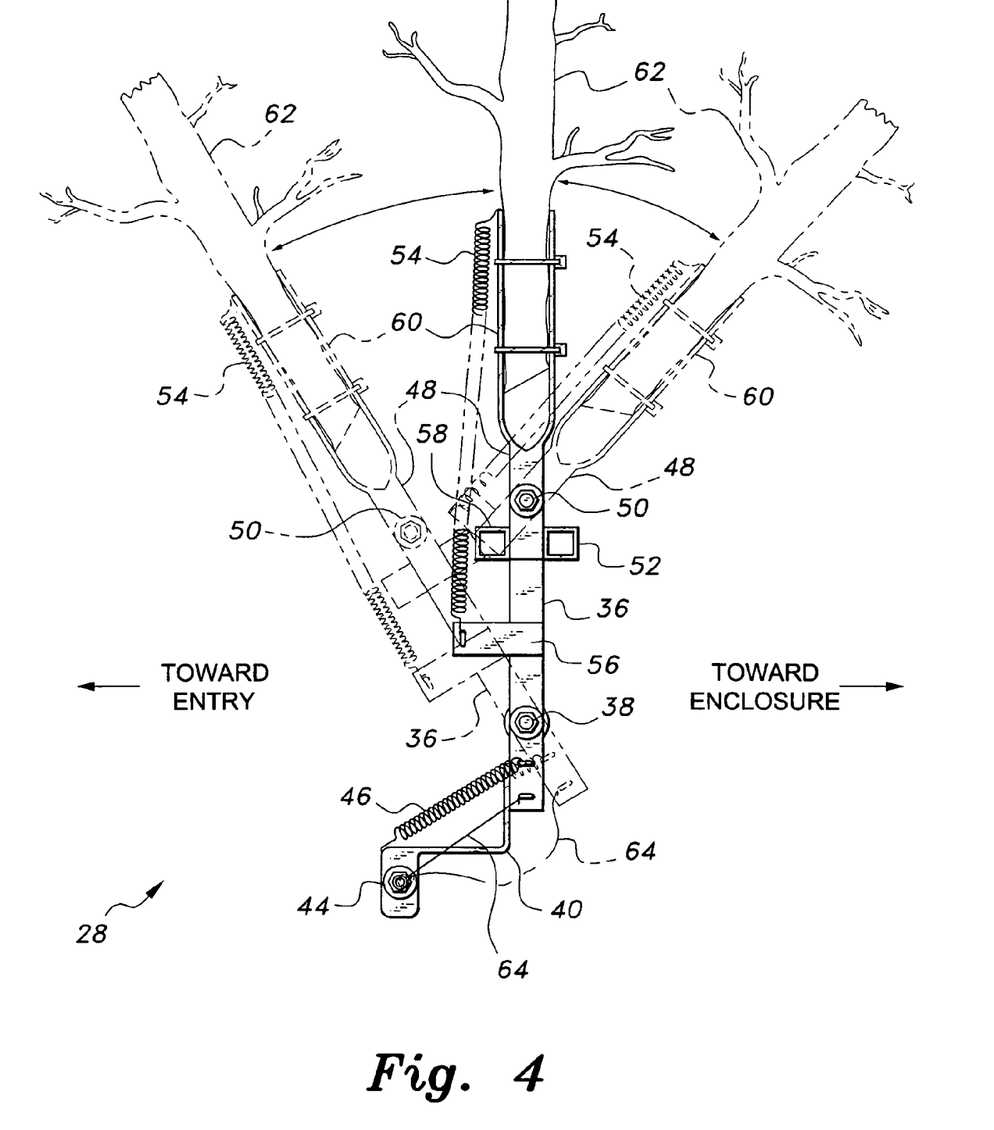
FIG. 4 is a top plan view of the trip arm of FIGS. 2 and 3.

FIGS. 2 through 4 illustrate an exemplary trip arm assembly 28 in detail. A solid base 30 (e.g., poured concrete, etc.) is provided, with a support post 32 (FIG. 3) extending upwardly from the base 30. The base 30 may be camouflaged as desired, and the support post 32 may have additional camouflage 34 installed therearound, e.g., a length of tree branch, etc. The support post 32 may comprise two telescoping lengths of material 32a and 32b, if so desired, as shown in FIG. 3, to allow the height of the trip arm assembly to be adjusted as desired.

A first articulating proximal arm segment 36 is pivotally attached to the top of the support post 32 by a pivot bolt or pin 38. A stationary arm 40 is immovably affixed to the top of the support post 32, with a proximal arm stop 42 affixed to one side of the stationary arm 40 extending upwardly to abut the entry side of the proximal arm segment 36 when in its rest position as shown in FIG. 2. The stationary arm 40 may be in the form of an L-bracket, with the distal portion of the arm or bracket 40 serving for the attachment of an electrical switch 44 thereto for actuation of the gate closure mechanism when the proximal arm segment 36 of the trip arm 28 is pivoted toward the entry 22 of the entry path 18. The stop 42 prevents the proximal arm segment 36 from swinging or pivoting in a clockwise direction, i.e., toward the enclosure as viewed in FIGS. 2 and 4, but allows the proximal arm segment 36 to swing or pivot counterclockwise or toward the entry gate. A return spring 46 is provided to return the proximal arm segment 36 to its rest position as shown in FIGS. 2 and 4 (solid lines).

A distal arm segment 48 is pivotally attached to the outer end of the proximal arm segment 36 by a distal arm pivot bolt or pin 50. A distal arm stop 52 is affixed to the outer portion of the proximal arm segment 36, on the side opposite the contact side for the proximal arm stop 42 of the stationary arm segment 40. A distal arm return spring 54 is attached to a lateral stub 56 extending from the proximal arm segment 36, with the spring 54 extending from the stub 56 to a point on the distal arm segment 48. The lateral stub 56 provides the lateral offset required for the distal arm return spring to draw the distal arm segment 48 back to its stationary position, i.e., aligned with the proximal arm segment 36, when clockwise pressure (as viewed in FIGS. 2 and 4) is released on the distal arm segment 48. A spring guide 58 extends upwardly from the inboard end of the distal arm segment 48, essentially between the two attach points for the distal arm return spring 54. The spring guide 58 extends into the plane of the distal arm return spring 54 and serves as a fulcrum to prevent over-center travel of the distal arm return spring 54 when the distal arm is deflected clockwise, as shown in FIG. 4.

The outer or more distal portion of the distal arm segment 48 is configured as a channel 60, for securing an arm extension 62 therein. The distal arm segment 48 and its channel 60 is relatively short, and does not extend nearly the entire width of the entry path 18 when installed therein. This configuration provides for the removable attachment of an arm extension 62 comprising a natural tree branch or the like. The arm extension branch 62 is removably secured in the channel 60 of the distal arm segment by any convenient means, e.g., string or cord, wire, plastic ratcheting ties, etc., as desired. The use of a natural element for the distal arm segment extension 62 reduces the likelihood of the animal(s) shying away from a man-made or synthetic structure or material.

The trip arm assembly 28 illustrated in FIGS. 2 through 4 is configured for the right side of the entry path 18 in the configuration shown in FIG. 1A, or for the right side of the path leading in from either gate 24A or 24B for the trap configuration 10b of FIG. 1B. It will be seen that this configuration is exemplary, and that it may be reversed to a mirror image for installation along the left side of the entry path. Preferably, a number of such left and right side trip arm assemblies 28 are installed along opposite sides of the entry path 18, or 18a of FIG. 1B, to ensure that at least one such trip arm 28 will be actuated by one or more animals passing along the entry path 18.

Assuming a right side installation for the trip arm assembly 28 shown in FIGS. 2 through 4, an animal passing through the entry path 18 from the entry end 22 toward the enclosure end 20 thereof will push the distal arm segment extension 62, and thus the distal arm segment 48, to the right to pivot clockwise as shown by the right side position in broken lines in FIG. 4. The proximal arm segment 36 cannot rotate to the right, due to the proximal arm stop 42. However, an animal returning through the entry path 18 from the enclosure end 20 toward the entry end 22 will push the distal arm segment extension 62 in the opposite direction from that described above, i.e., counterclockwise. The distal arm stop 52 extending upwardly from the proximal arm 36 prevents the distal arm segment 48 from rotating counterclockwise beyond its alignment with the proximal arm 36. Thus, as the distal arm segment 48 is pushed counterclockwise it forces the proximal arm segment 36 counterclockwise as well, as shown by the left side position of the two arms 36 and 48 in broken lines in FIG. 4.

A relatively light and frangible string or line 64 extends from the lever or toggle of the switch 44 to the inboard end of the proximal arm segment 36. As the switch position is fixed by the bracket 40 and the inboard end of the proximal arm segment 36 pivots away from the switch 44 when the arm segments 36 and 48 are pivoted counterclockwise, the string or line 64 pulls the switch toggle as the arms move, thereby pulling the switch 44 to the on position to close the circuit and actuate the gate mechanism. The relatively light string or line 64 breaks when the proximal arm 36 exceeds a predetermined pivot angle, as shown in broken lines in FIG. 4, to avoid damage to the switch 44 or other mechanism.

This arrangement is particularly well suited for the capture of a number of herd or pack animals, e.g., wild pigs and hogs, deer, etc. Typically, several animals will follow one another through the entry path 18, brushing aside the distal arm segment extension branches 62 on their way toward the enclosure 14. The proximal arm segment 36 remains stationary, as described above, and thus the switch 44 is not closed and the gate 24 remains open. Eventually one of the animals will decide to leave the area, with the only path being the entry path 18. As the animal pushes the distal arm segment extension branches aside on the way out, i.e., pivoting the distal arm 48 counterclockwise as shown in FIG. 4, the distal arm segment 48 locks against the stop 52 of the proximal arm 36, thus rotating the proximal arm counterclockwise as well. The string or line 64 then pulls the switch 44 toggle on to activate the gate mechanism, as noted above, trapping all of the animals within the enclosure 14 and entry path 18.

FIGS. 5 through 8 illustrate the automatic drop gate 24 of the animal trap 10a, and various details thereof. The two gates 24a and 24b of the trap 10b of FIG. 1B are identical to the gate 24 of the trap 10a. The gate 24 slides vertically in a drop gate frame 66 installed across the entry end 22 of the entry path 18, with the gate frame 66 having mutually opposed first and second sides 68a and 68b. the gate frame side members 68a and 68b are provided with slots 70, in which opposite left and right slides 72a and 72b slide. The slides 72a, 72b are affixed (e.g., welded, etc.) to their respective gate side members. This configuration allows the gate 24 to slide vertically between the gate frame side members 68a and 68b within the gate frame 66.

A rotary shaft 74 is installed laterally across the two gate frame side members 68a and 68b, with the shaft 74 having mutually opposed first and second ends 74a, 74b pivotally captured in corresponding left and right side shaft brackets 76a and 76b. The shaft 74 has opposite release pin pull brackets, respectively 78a and 78b, affixed to its respective opposite ends 74a, 74b and rotating with the shaft 74. Gate release pins, respectively 80a and 80b, are inserted through holes in the two release pin pull brackets 78a and 78b, and engage corresponding release pin passages 82a, 82b formed in the respective gate frame side members 68a and 68b. The gate and frame assembly preferably includes one such release pin assembly to each side of the gate, as shown in the drawings and described above. Alternatively, a single release pin assembly may be installed in only one side of the gate assembly if so desired, but two opposed release pin assemblies are preferred to avoid asymmetric loads on the gate 24 and frame 66 assembly.

The two gate release pin passages 82a, 82b are placed relatively high in the two gate frame side members 68a and 68b. The lower edges of the corresponding gate slides 72a, 72b rest upon the two gate release pins 80a and 80b when the gate 24 is raised, thus holding the gate at a height sufficient to allow animals to pass therethrough easily and without shying away from the structure. An electrically powered release mechanism 84, e.g., an electric motor driving a winch or spool 86, is connected to one of the release pin pull brackets 78a or 78b by a relatively light and frangible string or cord 88. The motor 84 and winch or spool 86 are shown to the right side of the gate in FIGS. 5 through 8, with the cord 88 thus being connected to the right side release pin pull bracket 78b. It will be seen that the motor, winch, and cord assembly could be installed on the left side of the gate if so desired. In either case, the rotary shaft 74 transfers motion applied to one of the brackets 78a or 78b to the opposite side bracket, so both brackets 78a and 78b move simultaneously when the mechanism is actuated by the motor 84. Alternatively, it will be seen that other gate release actuation means may be used if desired, e.g., an electric solenoid, etc.

When the motor 84 is actuated, it turns the winch or spool 86 to wind the string or cord 88 thereon. As the string or cord is tightened, it pulls the lever arm end of the release pin pull bracket 78a or 78b downwardly, thereby pulling the opposite end of the release pin pull bracket away from the gate frame side member, e.g., right side member 68b. This has the effect of pulling the gate release pin 80b from its position beneath the lower edge of the right side gate slide 72b, thereby allowing the gate 24 to fall within the frame 66 to close off the entry path 18 and enclosure 14 and trapping or capturing any animals contained therein. The electrical power line 90a, 90b (shown schematically in FIGS. 8 and 9) for the gate actuator or motor 84 extends upwardly over the top of the frame 66 and is attached to the gate 24. Thus, as the gate 24 falls, it separates the power line 90a, 90b at a connector 92 installed in the line, causing the line to separate at that point and cut off electrical power to the motor or actuator 84. The frangible string or cord 88 may also separate or break, as shown in broken lines in FIG. 8, in order to prevent any run-on from the motor from bending or damaging the pin release structure (bracket 78a, etc.).

Figure 5:
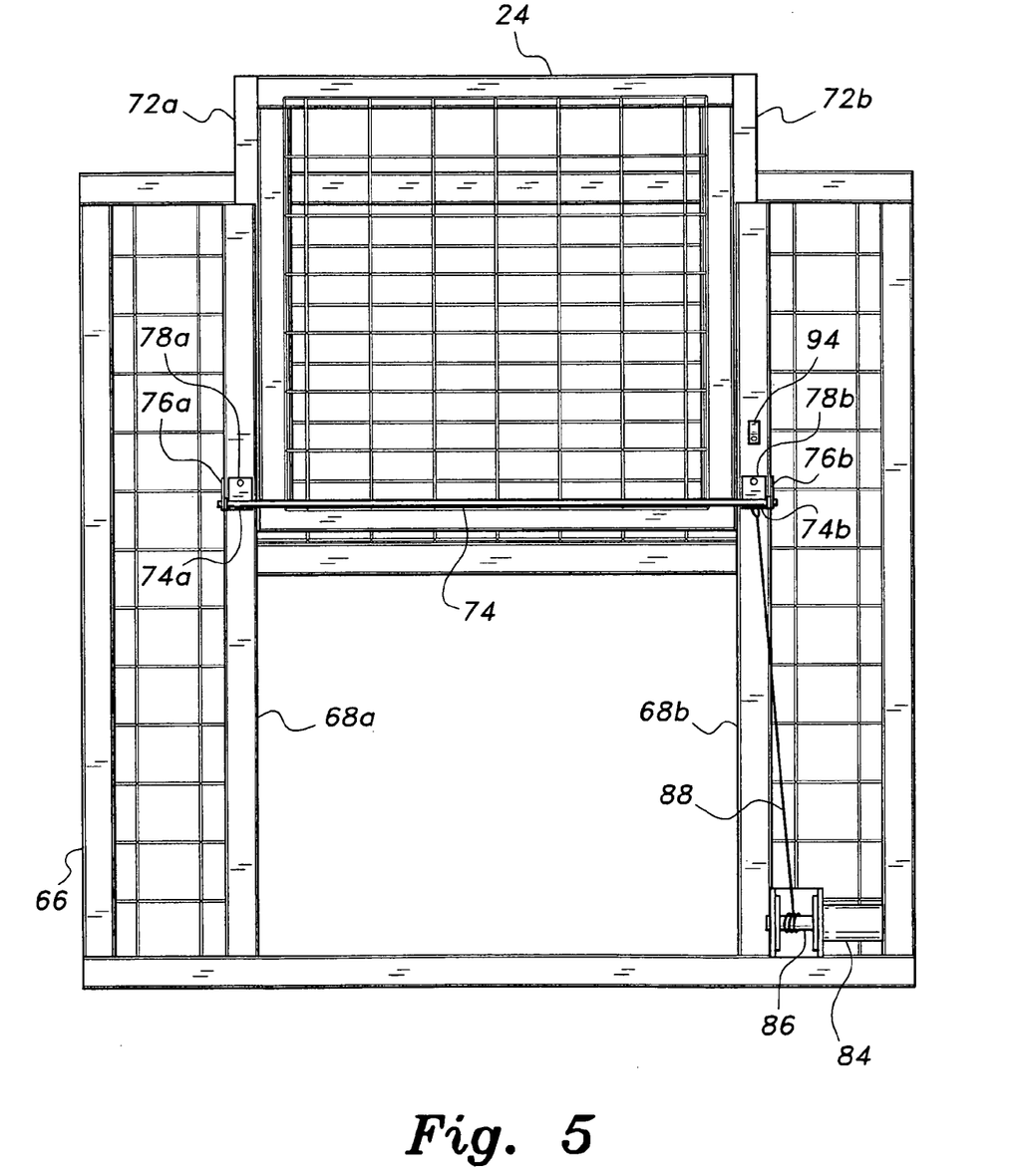
FIG. 5 is a front elevation view of the trap entrance and drop gate used with the present animal trap.
Figure 6:
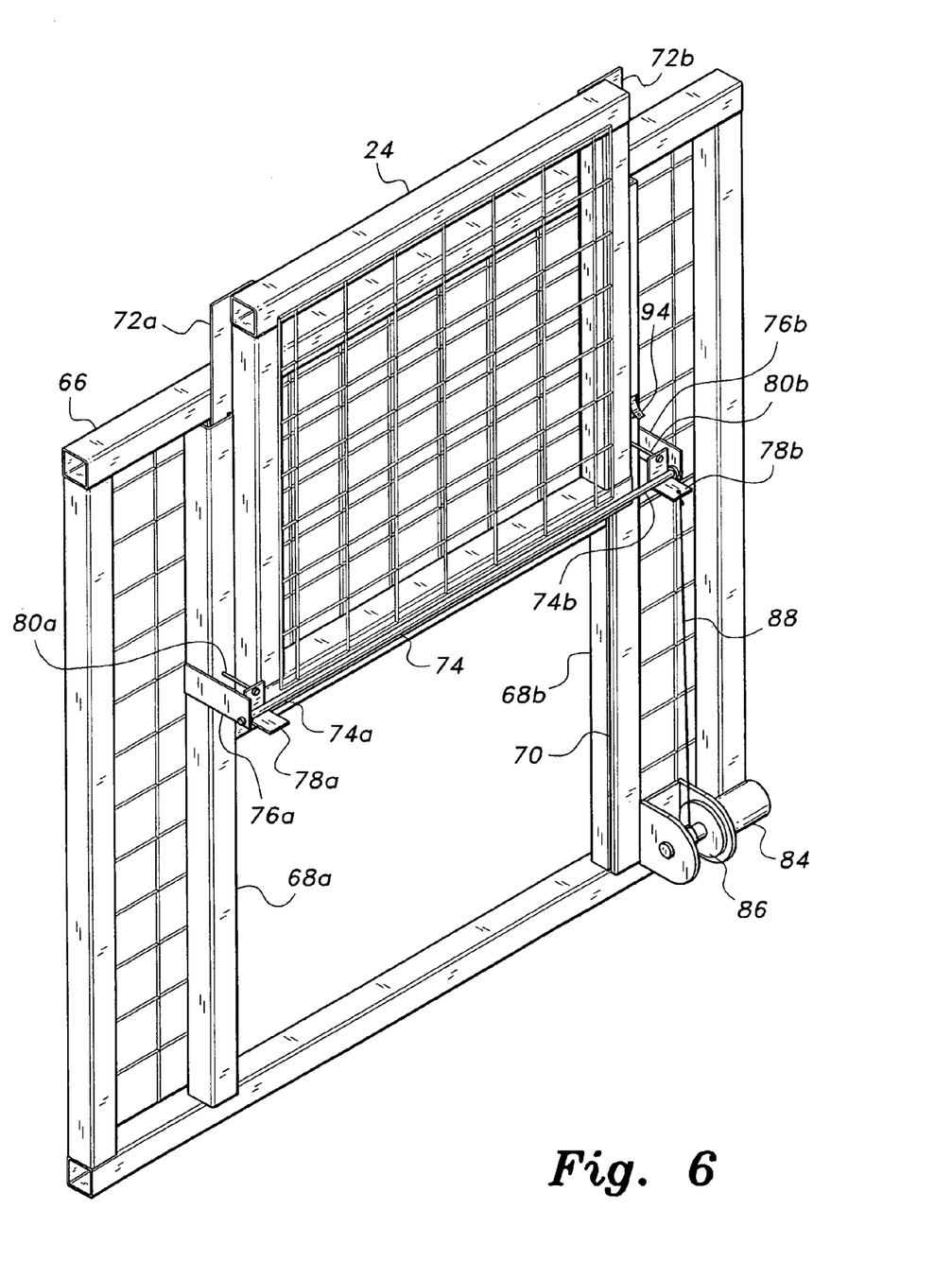
FIG. 6 is a perspective view of the gate actuation system used with the present animal trap.
Figure 7:
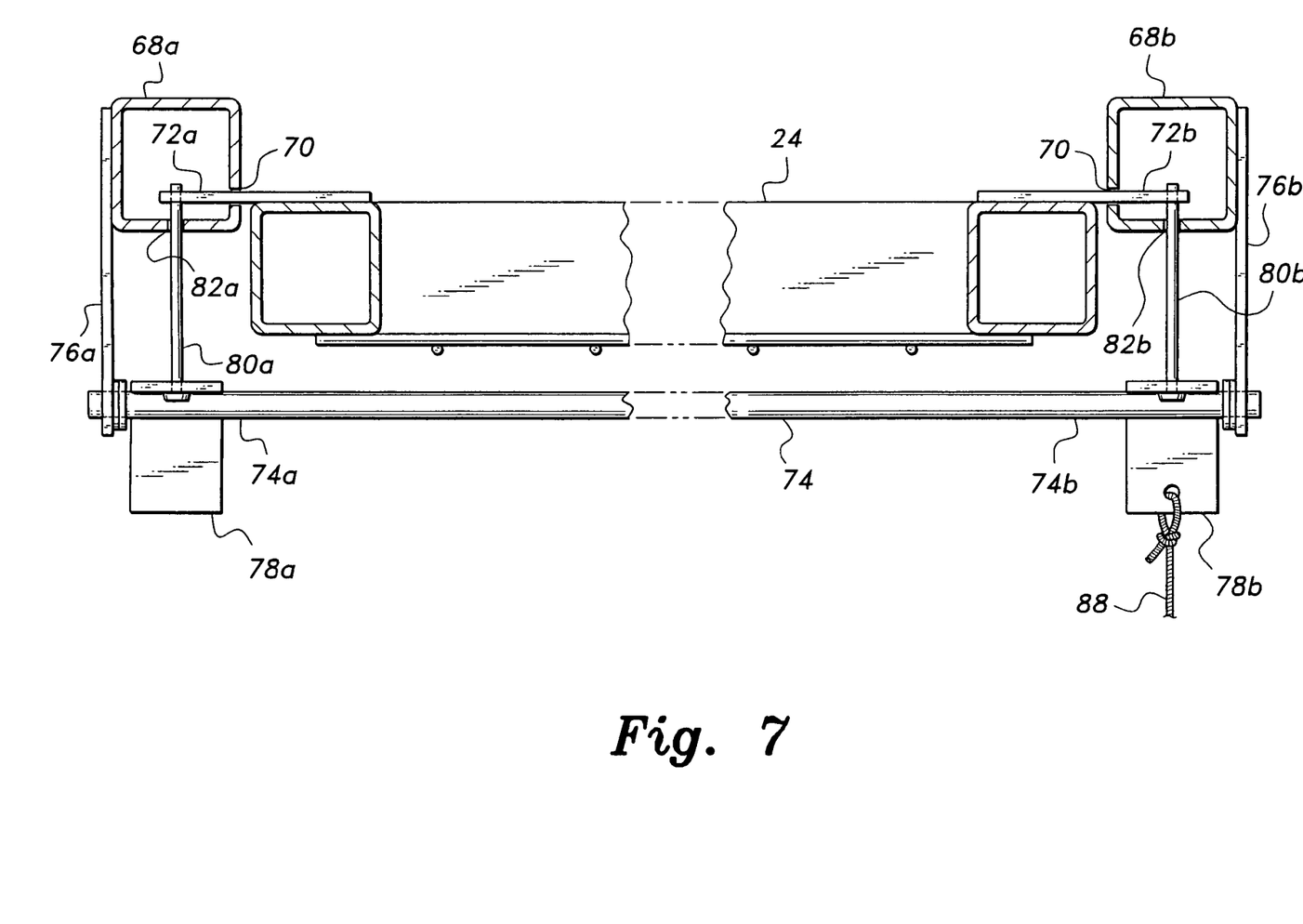
FIG. 7 is a detailed top plan view of the gate assembly of FIGS. 5 and 6, showing further details thereof.
Figure 8:
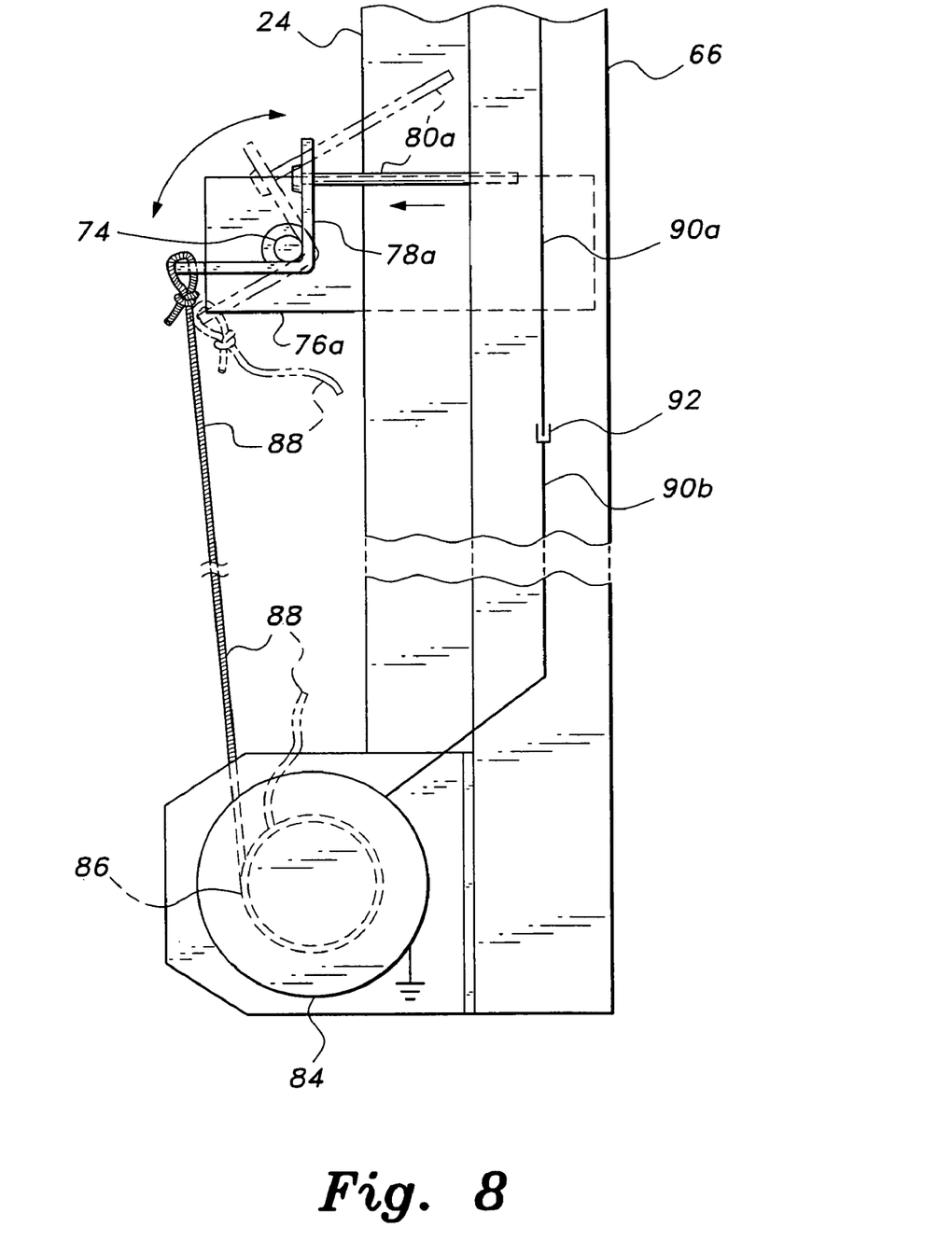
FIG. 8 is a detailed side elevation view of the gate assembly of FIGS. 5 through 7.

Preferably, a gate downlock mechanism is provided to prevent animals from prying the gate 24 up to escape. This is provided by a spring leaf and pin assembly 94 installed on either of the two gate frame side members 68a or 68b, e.g., side 68b as shown in FIGS. 5 and 6. The pin extends through the frame side member and bears against the corresponding gate slide, e.g., right side slide 72b, when the gate 24 is raised. When the gate 24 is dropped to the bottom of the frame 66, the pin is pushed over the top edge of the slide 72b by the spring leaf, thereby preventing the gate 24 from being raised until the spring leaf is pulled away from the frame side member 68b to pull the pin away from the top of the slide 72b.

Figure 9:
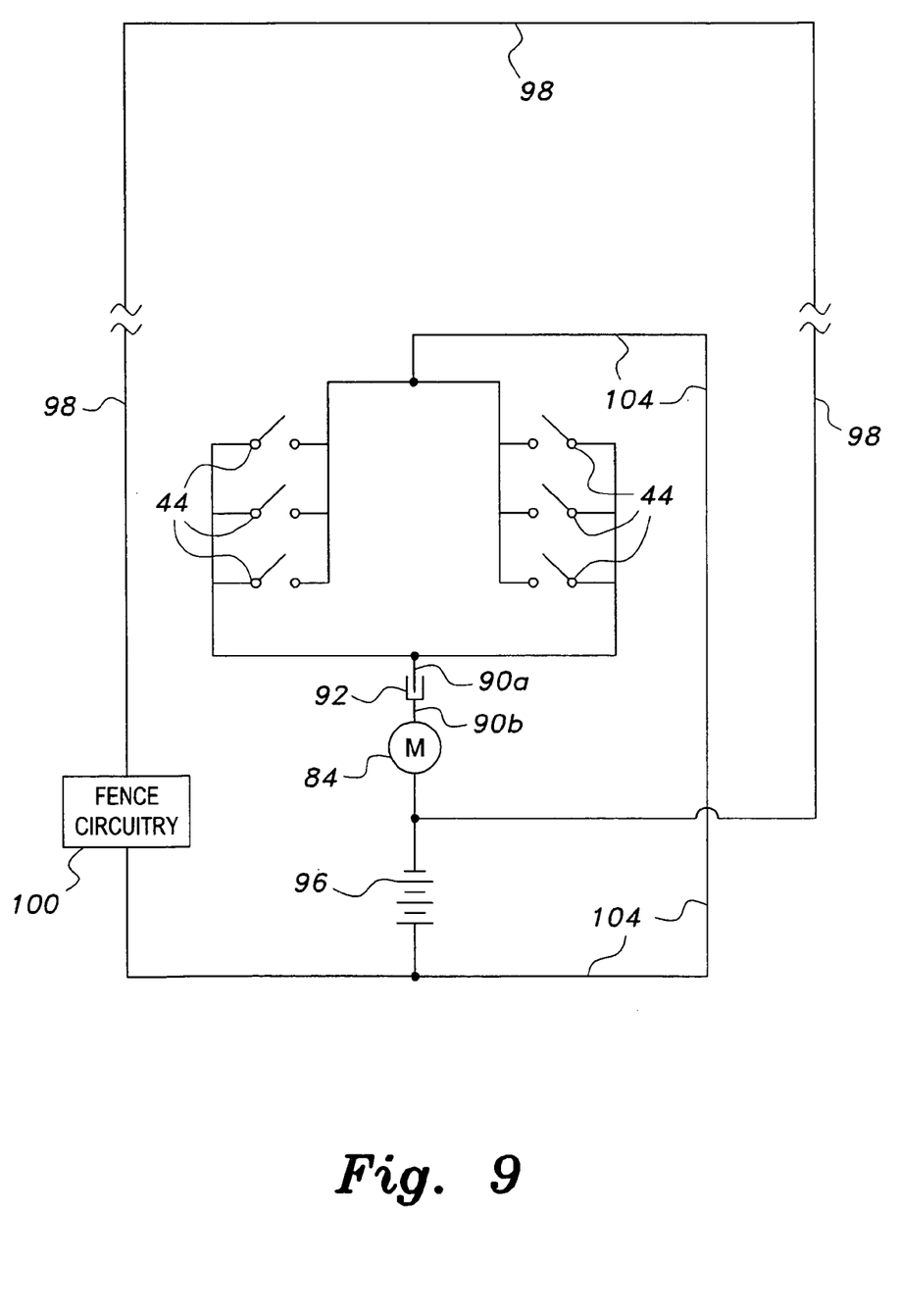
FIG. 9 is a schematic drawing of the electrical system used with the present animal trap.

FIG. 9 provides a schematic drawing of an exemplary electrical system that may be used with the present animal trap 10a or 10b. An electrical power source 96 (e.g., electrical storage battery, or alternatively electrical power from a generator or local power grid, etc.) is used to provide electrical power for the electrically powered gate release mechanism or motor 84 as well as other optional electrical componentry, e.g., a conventional electric fence or electrically charged wire strand 98 installed immediately within the enclosure and entry path fences 12 and 16, as shown in FIGS. 1A and 1B. The electric fence or wire strand 98 is controlled by a conventional electric fence control 100, as shown in FIG. 9, which receives its electrical power from the power source 96. The use of a fully charged electrical storage battery, e.g., a twelve volt automotive battery, is sufficient to provide power for the entire apparatus for days or even weeks, given that there is no appreciable power drain until the mechanism is actuated. The fence controller 100 draws little electrical power until the fence or electrical strand is grounded, which is likely to be a momentary condition.

Additional means of keeping captured animals away from the fences 12 and 16 may be provided by installing a continuous series of reasonably rigid, low friction skid plates 102 immediately within and adjacent to the enclosure and entry path fences 12 and 16, as shown in FIGS. 1A and 1B. Animals, and particularly hoofed animals such as wild pigs, hogs, and boar, deer, etc., have an aversion to stepping upon hard surfaces that provide little traction. Wild pigs, including wild hogs and boar, are particularly known to dig, and the installation of such skid plates 102 immediately within the fences 12 and 16 prevents them from digging beneath the fence to escape. Aluminum or steel sheet, or even reasonably rigid plastic sheet or smooth sheets of plywood or Masonite, is suitable for use as the skid plates 102.

Returning to FIG. 9, it will be seen that the entire apparatus draws electrical power from the electrical power source 96, as noted further above. The electric fence or strand 98 and its fence circuitry or controller 100 are on a separate, parallel circuit from the trip arm switches 44 and gate actuation motor 84, and share only the common power source 96 between the two. A trip arm electrical switch line 104 extends from the electrical power source 96 to the various trip arms of the system, or more precisely to their switches 44. The trip arm switches are wired in parallel with one another, in order that the tripping of any single switch will activate the gate motor 84. In FIG. 9, it will be seen that three such trip arm switches 44 are shown to each side of center, as the trip arm assemblies 28 would typically be arrayed along opposite sides of the entry path 18 as shown in FIG. 1. Six trip arm switches 44 are shown schematically in FIG. 9, while only four trip arms 28 are shown in FIG. 1A and at each end of the trail 18a of FIG. 1B. The specific number of trip arms 28 and their corresponding switches 44 may be varied depending upon the length of the entry path 18, terrain, the type of animal being sought, etc., as desired.

As animals enter the entry path 18 through the raised and open gate 24, they brush back only the distal arm segment 48 of the trip arm assembly 28 with the proximal arm segment 36 remaining stationary and the corresponding electrical switch 44 remaining open, as described in detail further above. However, when an animal decides to reverse its path through the entry path 18, the animal pushes the trip arm assembly in the opposite direction, thereby pivoting both arm segments 36 and 48 and causing the switch 44 to close. This actuates the motor 84 and allows the gate 24 to drop, as explained further above. The dropping of the gate 24 will occur before the animal(s) can reach the entry end 22 of the entry path 18 or 18a and escape from the trap 10a or 10b, assuming the trip arms 28 are located some distance from the entry end 22 of the entry path 18 of FIG. 1A or ends 22a, 22b of the game trail or path 18a, 18b of FIG. 1B. In any event, the sound of the motor being actuated will likely dissuade animals from proceeding toward the sound, thus assuring that they remain in the trap 10a or 10b. The system as shown in FIG. 1B operates in much the same manner as the system of FIG. 1A, with the trip arm assemblies 16 being set up to allow animals to travel inwardly along the trail to the portion of the path or trail between the two gates 24a and 24b, but with the trip arms tripping the corresponding gate 24a or 24b as the animal attempts to move through the trip arm assemblies toward that corresponding gate.

The animal trap 10a or 10b may be used to trap numerous different species of animals, but is particularly effective in trapping wild pigs, hogs, and boar. These animals are known to be particularly damaging to agricultural crops, due to their digging and their appetites for such crops. Moreover, they have proven to be quite valuable as food animals in many nations and areas. Alternatively, the dimensions of the trap 10a or 10b may be adjusted as required for the capture of various other wild animals, and particularly pack or herd animals such as deer, etc. The basic principles shown and described herein remain valid for the capturing of most all species of herd and pack animals.

It is to be understood that the present invention is not limited to the embodiments described above, but encompasses any and all embodiments within the scope of the following claims.

I claim:
1. An animal trap, comprising:
   an enclosure fence defining a periphery of an enclosure therein;
   an entry path fence defining a periphery of a narrow, elongate entry path communicating with the enclosure, the entry path having at least one entry end;
   an automated gate selectively closing each entry end of the entry path; and
   at least one double articulating trip arm disposed along the entry path, the trip arm having:
   a proximal arm segment free to rotate in a direction from an enclosure end of the entry path toward the at least one entry end of the entry path and restricted from rotation in a direction from the at least one entry end toward the enclosure end of the entry path;
   a distal arm segment free to rotate in a direction from the at least one entry end toward the enclosure end of the entry path and restricted from rotation in a direction from the enclosure end toward the at least one entry end of the entry path; and
   a switch mechanism activating closure of the automated gate when actuated by rotation of the proximal arm segment.

2. The animal trap according to claim 1, further comprising:
   a drop gate frame disposed at each entry end of the entry path, the frame having a first side, a second side opposite the first side, and at least one release pin passage in at least one of the first and second sides of the frame, the gate slidably disposed within the frame;
   a rotary shaft extending laterally across the gate, the shaft having a first end pivotally attached to the first side of the frame and a second end pivotally attached to the second side of the frame;
   at least one gate release pin extending from at least one of the first and second ends of the shaft, the at least one pin selectively extending through the at least one release pin passage of the frame and supporting the gate thereon; and
   an electrically powered release mechanism communicating mechanically with the rotary shaft, the at least one trip arm selectively actuating the release mechanism, thereby rotating the rotary shaft to withdrawn the at least one gate release pin from the drop gate frame and releasing the drop gate within the frame.

3. The animal trap according to claim 1, further comprising a plurality of substantially rigid, low friction skid plates disposed immediately within the enclosure fence and the entry path fence.

4. The animal trap according to claim 1, further comprising:
   the switch mechanism comprising an electric switch disposed at the at least one trip arm;
   an electric gate actuator disposed at the gate, and communicating electrically with the electric switch of the at least one trip arm; and
   an electric power source connected to the electric gate actuator.

5. The animal trap according to claim 1, further comprising at least one gate lock mechanism precluding opening of the closed gate until released.

6. The animal trap according to claim 1, further comprising a plurality of trip arms disposed along the entry path.

7. The animal trap according to claim 1, further comprising:
- an electrically charged barrier surrounding the enclosure fence and the entry path fence; and
- an electric power source connected to the electrically charged barrier.

8. An animal trap, comprising:
- an enclosure fence defining a periphery of an enclosure therein;
- an entry path fence defining a periphery of a narrow, elongate entry path communicating with the enclosure, the entry path having at least one entry end;
- a drop gate frame disposed at the at least one entry end of the entry path, the frame having a first side, a second side opposite the first side, and at least one release pin passage in at least one of the first and second sides of the frame;
- an automated gate disposed in the drop gate frame, the gate selectively closing the at least one entry end of the entry path;
- a rotary shaft extending laterally across the gate, the shaft having a first end pivotally attached to the first side of the frame and a second end pivotally attached to the second side of the frame;
- at least one gate release pin extending from at least one of the first and second ends of the shaft, the at least one pin selectively extending through the at least one release pin passage of the frame and supporting the gate thereon;
- an electrically powered release mechanism communicating mechanically with the rotary shaft; and
- at least one trip arm disposed along the entry path, the at least one trip arm selectively actuating the release mechanism, thereby rotating the rotary shaft to withdraw the at least one gate release pin from the drop gate frame and releasing the drop gate within the frame.

9. The animal trap according to claim 8, the at least one trip arm further comprising at least one double articulating trip arm disposed along the entry path, the at least one double articulating trip arm having:
- a proximal arm segment free to rotate in a direction from an enclosure end of the entry path toward the at least one entry end of the entry path and restricted from rotating in a direction from the at least one entry end toward the enclosure end of the entry path;
- a distal arm segment free to rotate in a direction away from the at least one entry end toward the enclosure end of the entry path and restricted from rotation in a direction from the enclosure end toward the at least one entry end of the entry path; and
- a switch mechanism activating closure of the automated gate when actuated by rotation of the proximal arm segment.

10. The animal trap according to claim 8, further comprising a plurality of substantially rigid, low friction skid plates disposed immediately within the enclosure fence and the entry path fence.

11. The animal trap according to claim 8, further comprising:
- an electric switch disposed at the at least one trip arm;
- an electric gate actuator disposed at the gate, and communicating electrically with the electric switch of the at least one trip arm; and
- an electric power source connected to the electric gate actuator.

12. The animal trap according to claim 8, further comprising at least one gate lock mechanism precluding opening of the closed gate until released.

13. The animal trap according to claim 8, further comprising a plurality of trip arms disposed along the entry path.

14. The animal trap according to claim 8, further comprising:
- an electrically charged barrier surrounding the enclosure fence and the entry path fence; and
- an electric power source connected to the electrically charged barrier.

15. An animal trap, comprising:
- an enclosure fence defining a periphery of an enclosure therein;
- an entry path fence defining a periphery of a narrow, elongate entry path communicating with the enclosure, the entry path having at least one entry end;
- a plurality of substantially rigid, low friction skid plates disposed immediately within the enclosure fence and the entry path fence;
- an automated gate selectively closing the at least one entry end of the entry path;
- at least one trip arm disposed along the entry path, the at least one trip arm selectively actuating the automated gate to close the at least one entry end of the entry path;
- a switch mechanism comprising an electric switch disposed at the trip arm;
- an electric gate actuator disposed at the gate, and communicating electrically with the electric switch of the at least one trip arm;
- an electrically charged barrier surrounding the enclosure fence and the entry path fence; and
- an electric power source connected to the electric gate actuator and electrically charged barrier.

16. The animal trap according to claim 15, the at least one trip arm further comprising at least one double articulating trip arm disposed along the entry path, the at least one double articulating trip arm trip arm having:
- a proximal arm segment free to rotate in a direction from an enclosure end of the entry path toward the at least one entry end of the entry path and restricted from rotation in a direction from the at least one entry end toward the enclosure end of the entry path;
- a distal arm segment free to rotate in a direction from the at least one entry end toward the enclosure end of the entry path and restricted from rotation in a direction from the enclosure end toward the at least one entry end of the entry path; and
- the switch mechanism activating closure of the automated gate when actuated by rotation of the proximal arm segment.

17. The animal trap according to claim 15, further comprising:
- a drop gate frame disposed at the at least one entry end of the entry path, the frame having a first side, a second side opposite the first side, and at least one release pin passage in at least one of the first and second sides of the frame, the gate slidably disposed within the frame;
- a rotary shaft extending laterally across the gate, the shaft having a first end pivotally attached to the first side of the frame and a second end pivotally attached to the second side of the frame;

at least one gate release pin extending from at least one of the first and second ends of the shaft, the at least one pin selectively extending through the at least one release pin passage of the frame and supporting the gate thereon;

the electric gate actuator comprising an electrically powered release mechanism communicating mechanically with the rotary shaft thereby selectively rotating the rotary shaft to withdraw the at least one gate release pin from the drop gate frame and releasing the drop gate within the frame when the at least one trip arm is actuated.

18. The animal trap according to claim 15, further comprising at least one gate lock mechanism precluding opening of the closed gate until released.

19. The animal trap according to claim 15, further comprising a plurality of trip arms disposed along the entry path.

* * * * *